(12) United States Patent
Sun et al.

(10) Patent No.: US 7,777,643 B2
(45) Date of Patent: Aug. 17, 2010

(54) OPTICAL COMMUNICATIONS WITH A BOTTOM HOLE ASSEMBLY

(75) Inventors: Cili Sun, Sugar Land, TX (US); Laban Marsh, Houston, TX (US); Billy Bankston, Houston, TX (US); Jay Martin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 963 days.

(21) Appl. No.: 10/839,873

(22) Filed: May 6, 2004

(65) Prior Publication Data
US 2005/0249503 A1 Nov. 10, 2005

(51) Int. Cl.
*G01V 3/00* (2006.01)

(52) U.S. Cl. ............... 340/853.9; 340/854.6; 340/854.7; 340/854.9; 398/135; 398/182; 398/195; 166/372; 175/40

(58) Field of Classification Search ............... 340/854.6, 340/853.9; 166/372; 175/40; 398/135, 182–195
See application file for complete search history.

(56) References Cited

U.S. PATENT DOCUMENTS

| | | | | |
|---|---|---|---|---|
| 4,721,355 A * | 1/1988 | Gould | ........................... | 385/76 |
| 4,794,534 A | 12/1988 | Millheim | .................... | 364/420 |
| 4,849,753 A * | 7/1989 | Merry | ..................... | 340/854.7 |
| 4,891,640 A * | 1/1990 | Ip | ........................... | 340/854.7 |
| 4,928,088 A | 5/1990 | Jorion et al. | | |
| 5,013,247 A | 5/1991 | Watson | ........................ | 439/55 |
| 5,082,338 A | 1/1992 | Hodge | ........................... | 385/81 |
| 5,493,626 A * | 2/1996 | Schultz et al. | ............... | 385/101 |
| 5,506,921 A | 4/1996 | Horie | ........................... | 385/53 |
| 5,825,961 A * | 10/1998 | Wilkins et al. | ............... | 385/135 |
| 5,892,176 A * | 4/1999 | Findlay et al. | .............. | 174/115 |
| 5,959,547 A * | 9/1999 | Tubel et al. | ............... | 340/853.2 |
| 6,012,015 A * | 1/2000 | Tubel | ........................... | 702/6 |
| 6,041,872 A | 3/2000 | Holcomb | ..................... | 175/40 |
| 6,257,332 B1 | 7/2001 | Vidrine et al. | ......... | 166/250.15 |
| 6,531,694 B2 | 3/2003 | Tubel et al. | ............ | 250/227.14 |
| 6,557,630 B2 | 5/2003 | Harkins et al. | ......... | 166/250.01 |
| 6,564,866 B2 | 5/2003 | Clark et al. | ............. | 166/250.12 |
| 6,748,181 B2 * | 6/2004 | Miki et al. | .................... | 398/195 |
| 7,321,606 B2 * | 1/2008 | Wu et al. | .................... | 372/38.1 |
| 2001/0029780 A1 * | 10/2001 | Bartel | ....................... | 73/152.03 |
| 2002/0007948 A1 | 1/2002 | Bayne et al. | ................. | 166/278 |
| 2002/0027690 A1 * | 3/2002 | Bartur et al. | ................. | 359/152 |
| 2002/0066309 A1 * | 6/2002 | Tubel et al. | .............. | 73/152.54 |

(Continued)

FOREIGN PATENT DOCUMENTS

WO WO-9641066 A1 12/1996

(Continued)

OTHER PUBLICATIONS

International Search Report—PCTUS2005/016130, Authorized Office—Luis-Miguel Paredes Sanchez,(May 6, 2005),17.

*Primary Examiner*—Timothy Edwards, Jr.
(74) *Attorney, Agent, or Firm*—Schwegman, Lundberg & Woessner, P.A.

(57) ABSTRACT

One embodiment includes an apparatus that includes a storage medium to store data. The apparatus also includes a connector having an optical interface for data communication, coupled to the storage medium, to communicate in a combustible gas environment.

41 Claims, 8 Drawing Sheets

U.S. PATENT DOCUMENTS

| | | | |
|---|---|---|---|
| 2003/0010500 A1 | 1/2003 | Smith | 166/336 |
| 2003/0034177 A1 | 2/2003 | Chitwood et al. | 175/61 |
| 2003/0042019 A1 | 3/2003 | Harkins et al. | 166/250.01 |
| 2003/0094281 A1 | 5/2003 | Tubel | 166/250.03 |
| 2007/0168132 A1* | 7/2007 | Yu et al. | 702/6 |
| 2008/0158004 A1* | 7/2008 | Latrille et al. | 340/853.1 |

FOREIGN PATENT DOCUMENTS

WO  WO-2005107429 A2  11/2005

* cited by examiner

OPTICAL COMMUNICATIONS WITH A BOTTOM HOLE ASSEMBLY

TECHNICAL FIELD

The application relates generally to communications, more particularly, to optical communications with a bottom hole assembly.

BACKGROUND

Monitoring of various parameters and conditions downhole during drilling operations is important in locating and retrieving hydrocarbons, such as oil and gas, there from. Such monitoring of the parameters and conditions downhole is commonly defined as "logging". Boreholes are drilled through various formations at different levels of temperature/pressure to locate and retrieve these hydrocarbons. Accordingly, a number of different sensors are used to monitor the parameters and conditions downhole, including the temperature and pressure, the various characteristics of the subsurface formations (such as resistivity, porosity, etc.), the characteristics of the borehole (e.g., size, shape, etc.), etc. Such sensors may include electromagnetic propagation sensors, nuclear sensors, acoustic sensors, pressure sensors, temperature sensors, etc. The data generated from the measurements by these sensors can become voluminous (e.g., data related to sonic and imaging information).

Typically, such data may initially be stored in various components downhole. The data is then downloaded from these components to a computing device on the surface for analysis and possible modifications to the current drilling operations. A current approach for downloading and downloading of this data includes the use of low data rate electrical connections after the downhole drilling tools are pulled out of the borehole. Two different types of communications are typically used for such retrieval. A first type includes a communication having a transformer with a single ended data signal. However, this type of communication typically has a low data rate (e.g., less than 50 kilobits per second) because of the transformer selections and high capacitive loading presented at the tools and cables. Additionally, the single ended data signal is sensitive to different noise sources (such as ground noise) that are coupled to the wires used for communication. A second type of communication provides for differential signaling using RS-485 drivers and receivers. However, the data rate for this second type of communication is usually limited to approximately two-four megabits/second at approximately 1000 feet. Moreover, these two different approaches could not operate at an acceptable data rate in a Class I, Division 1 Area, Zone 0 or Zone 1 on the drilling floor because of the hazardous risks associated with the electrical connections in an ambient gaseous environment that may include combustible gases. Data rates about 100 megabits are usually difficult to be intrinsic safely protected using barriers.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a system 100 can be located in FIG. 1. However, reference numbers are the same for those elements that are the same across different Figures. In the drawings.

DETAILED DESCRIPTION

Methods, apparatus and systems for optical data communications with a bottom hole assembly (such as a downhole drilling tool) are described. In the following description, numerous specific details are set forth. However, it is understood that embodiments of the invention may be practiced without these specific details. In other instances, well-known circuits, structures and techniques have not been shown in detail in order not to obscure the understanding of this description.

While described in reference to communications with a downhole tool. Embodiments of the invention may be used in conjunction with any other type of bottom hole assembly. Additionally, embodiments of the invention may relate to different types of communication involving the bottom hole assemblies. For example, embodiments of the invention may relate to the downloading from and uploading to different types of bottom hole assemblies.

While described in reference to communications with a Measurement While Drilling (MWD) or Logging While Drilling (LWD) tool strings after such strings are pulled at or near the surface of the borehole, embodiments of the invention are not so limited. For example, embodiments of the invention may be used for communications with other types of downhole tools such as wireline tools during a logging phase, etc. As used herein, the terms "Class I, Division 1 area" and "intrinsically safe" are defined by the NATIONAL ELECTRICAL CODE® (NEC®) 2002 by the National Fire Protection Association, which is hereby incorporated by reference. The terms Zone 0 and Zone 1 are defined by the International Electrotechnical Commission (EEC).

Figure 1:
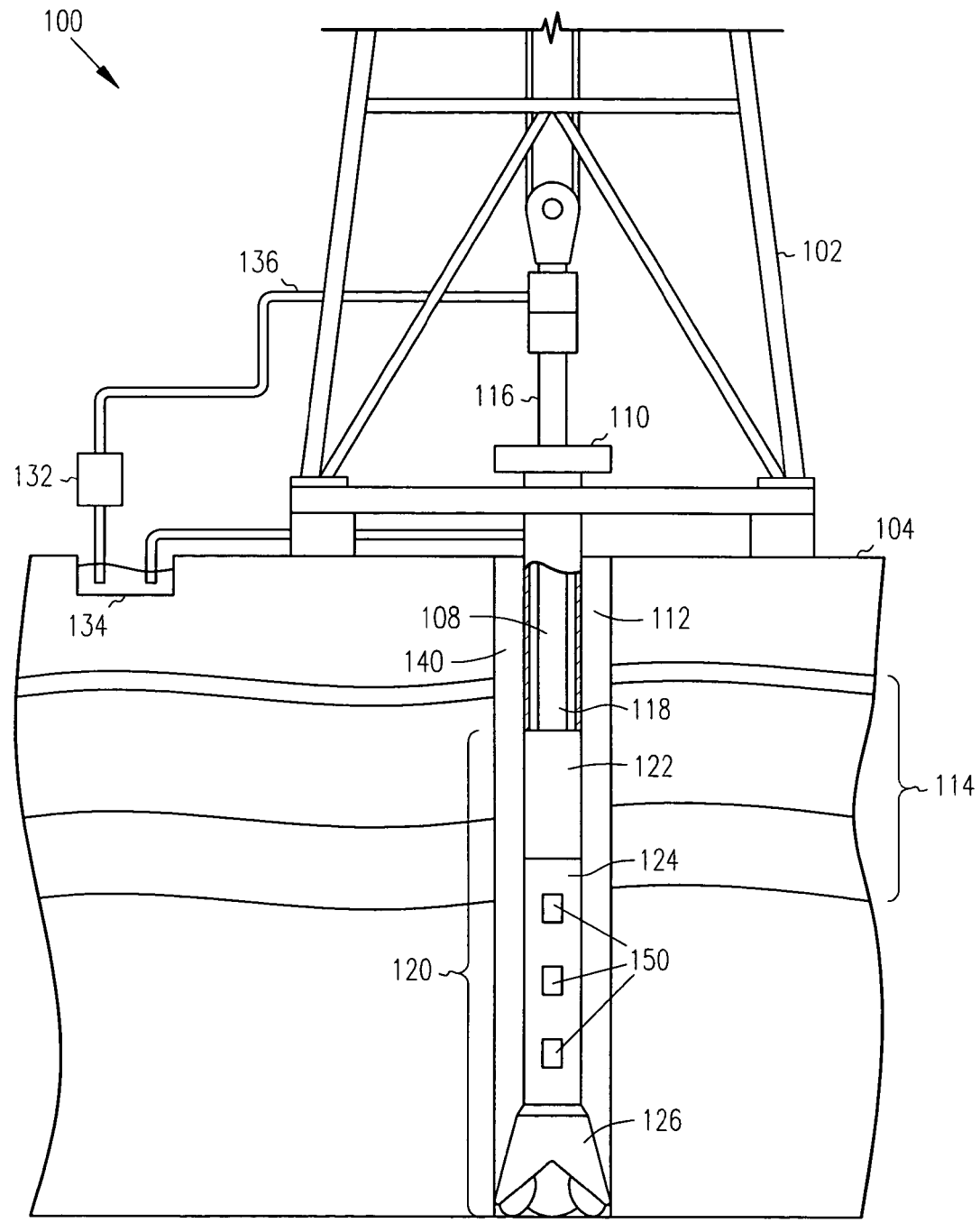
FIG. 1 illustrates a system for drilling operations, according to one embodiment of the invention.

FIG. 1 illustrates a system for drilling operations, according to one embodiment of the invention. A system 100 includes a drilling rig 102 located at a surface 104 of a well. The drilling rig 102 provides support for a drill string 108. The drill string 108 penetrates a rotary table 110 for drilling a borehole 112 through subsurface formations 114. The drill string 108 includes a Kelly 116 (in the upper portion), a drill pipe 118 and a bottom hole assembly 120 (located at the lower portion of the drill pipe 118). The bottom hole assembly 120 may include drill collars 122, a downhole tool 124 and a drill bit 126. The downhole tool 124 may be any of a number of different types of tools including MWD tools, LWD tools, etc.

During drilling operations, the drill string 108 (including the Kelly 116, the drill pipe 118 and the bottom hole assembly 120) may be rotated by the rotary table 110. In addition or alternative to such rotation, the bottom hole assembly 120 may also be rotated by a motor (not shown) that is downhole. The drill collars 122 may be used to add weight to the drill bit 126. The drill collars 122 also may stiffen the bottom hole assembly 120 to allow the bottom hole assembly 120 to transfer the weight to the drill bit 126. Accordingly, this weight provided by the drill collars 122 also assists the drill bit 126 in the penetration of the surface 104 and the subsurface formations 114.

During drilling operations, a mud pump 132 may pump drilling fluid (known as "drilling mud") from a mud pit 134 through a hose 136 into the drill pipe 118 down to the drill bit 126. The drilling fluid can flow out from the drill bit 126 and return back to the surface through an annular area 140 between the drill pipe 118 and the sides of the borehole 112. The drilling fluid may then be returned to the mud pit 134, where such fluid is filtered. Accordingly, the drilling fluid can cool the drill bit 126 as well as provide for lubrication of the drill bit 126 during the drilling operation. Additionally, the drilling fluid removes the cuttings of the subsurface formations 114 created by the drill bit 126.

The downhole tool 124 may include one to a number of different sensors 150, which monitor different downhole parameters and generate data that is stored within one or more different storage mediums within the downhole tool 124. The type of downhole tool 124 and the type of sensors 150 thereon may be dependent on the type of downhole parameters being measured. Such parameters may include the downhole temperature and pressure, the various characteristics of the subsurface formations (such as resistivity, radiation, density, porosity, etc.), the characteristics of the borehole (e.g., size, shape, etc.), etc.

In an embodiment, the drill string 108 is tripped out from the borehole 112. Once at or near the surface of the borehole, optical data communications with different parts of the bottom hole assembly 120 (such as the downhole tool 124) may occur. For example, the data may be downloaded from the storage mediums within the downhole tool 124 into a storage medium within a computing/storage device. As further described below, in one embodiment, the downhole tool 124 is coupled to the computing/storage device through a cable that may includes optical signal carrier(s) (e.g., fiber optic cable) and electrical signal carrier(s) (e.g., electrical wire). A cable that includes both fiber and wire is referred to as a hybrid cable. While described with reference to a hybrid cable, embodiments of the invention are not so limited. The electrical signal carrier(s) therein may be used to provide low-voltage power (e.g., less than about 12 volts and may be intrinsically barriered) to the electronics within the downhole tool 124 to power electronics necessary for the download or upload of data. The electrical signal carrier(s) may also be used as a slow speed communication media. The optical signal carrier(s) is used to provide the communication medium for the downloading and uploading of the data. Accordingly, optical (and not electrical) communications are used data communications within an ambient environment that may include combustible/ignitable gases (e.g., a Class I, Division 1 Area, Zone 0 or Zone 1). As further described below, the data communication rate using optical communications is higher relative to electrical communications. Moreover, the design used for such an optical communication can be done in such a manner as to make it "intrinsically safe" within this potentially hazardous environment and thus satisfy the requirements of operation in a Class I, Division 1 Area, Zone 0 or Zone 1.

Figure 2A:
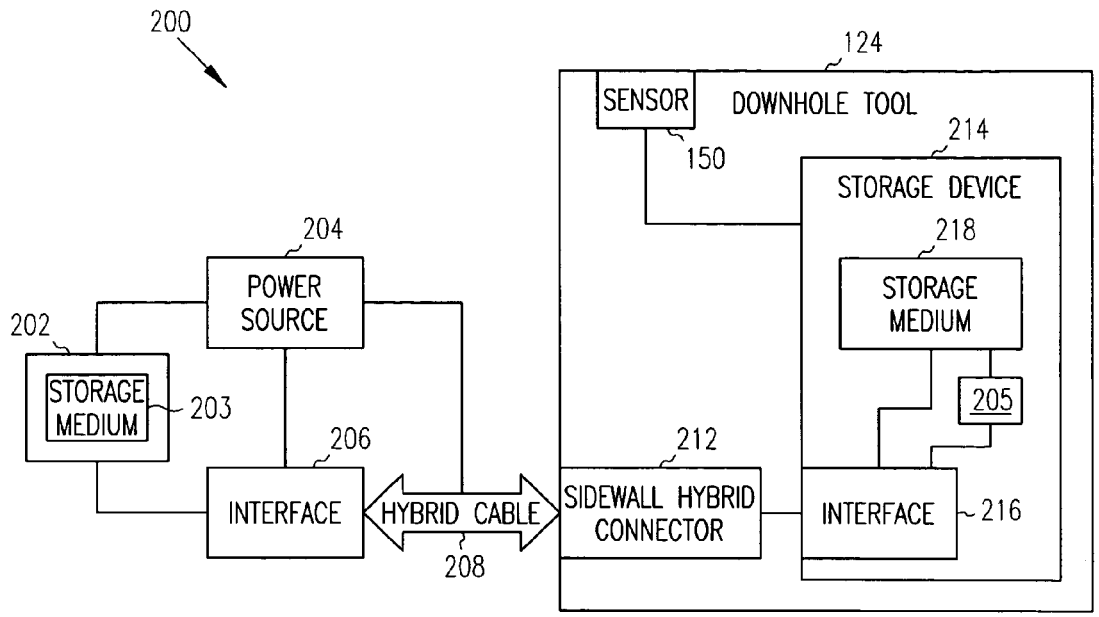
FIG. 2A illustrates a block diagram of a system for data communications with a downhole tool, according to one embodiment of the invention.

FIG. 2A illustrates a block diagram of a system for data communications with a downhole tool, according to one embodiment of the invention. In particular, FIG. 2A illustrates a system 200 that includes the downhole tool 124, a computing device 202, a power source 204, an interface 206 and a hybrid cable 208. In some embodiments, the system 200 is such that the downhole tool 124 is on the surface of the borehole (such as on the rig floor of the drilling rig 102) during communications for downloading and uploading of data.

Figure 5A:
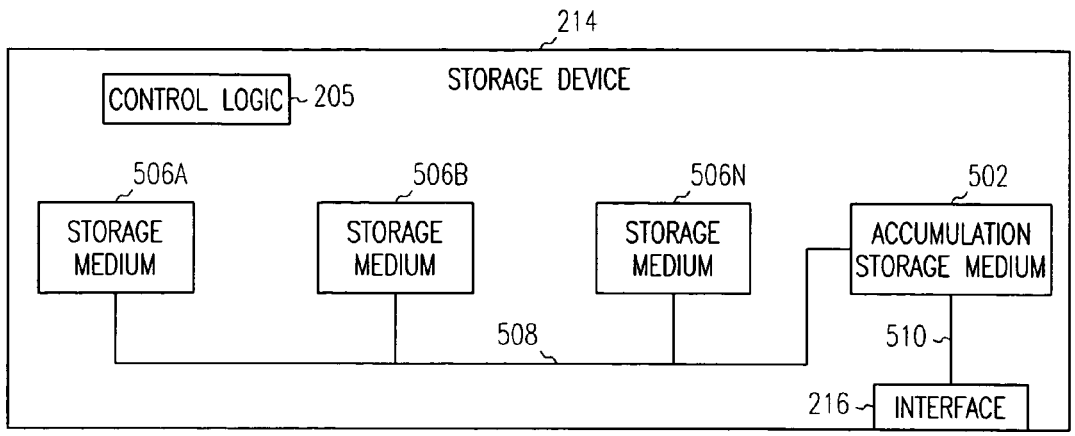
FIG. 5A illustrates a more detailed block diagram of a storage device within a downhole tool having an electrical signal carrier for communications therein, according to one embodiment of the invention.
Figure 5B:
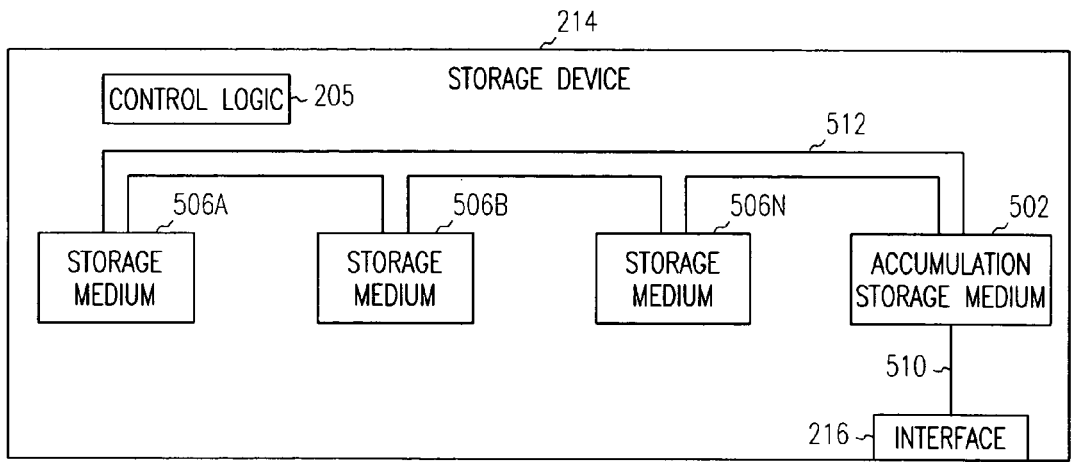
FIG. 5B illustrates a more detailed block diagram of a storage device within a downhole tool having an optical signal carrier for communications therein, according to one embodiment of the invention.
Figure 5C:
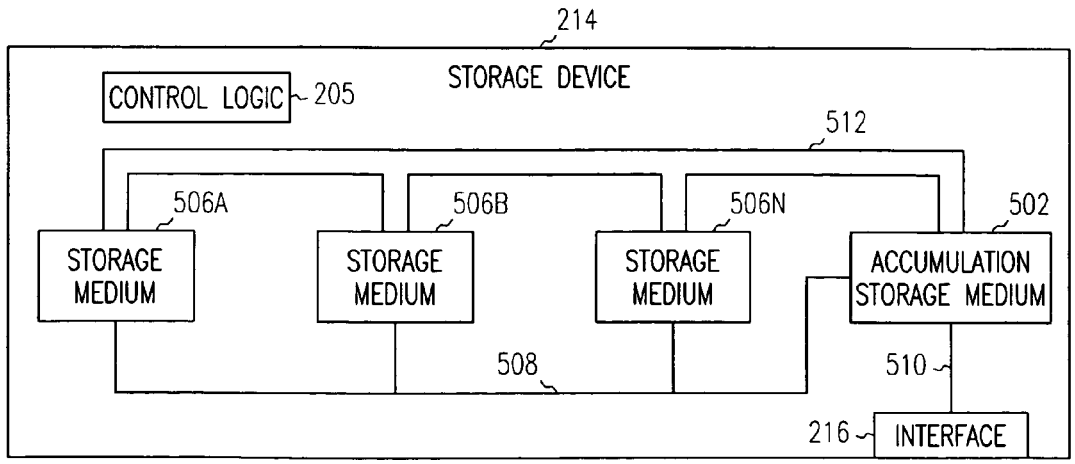
FIG. 5C illustrates a more detailed block diagram of a storage device within a downhole tool having an electrical signal carrier and an optical signal carrier, according to one embodiment of the invention.

The downhole tool 124 includes the sensor 150, a sidewall hybrid connector 212 and a storage device 214. The storage device 214 includes an interface 216, a storage medium 218 and a control logic 205. The control logic 205 is coupled to the storage medium 218 and the interface 216. The control logic 205 may control operations of the storage device 214 (such as the inputting/output of data thereto). The control logic 205 may be hardware, software or a combination thereof. Accordingly, the storage device 214 may be representative of different electronics (hardware, software, etc.). Some embodiments of the storage device 214 are illustrated in FIGS. 5A-5C, which are also described in more detail below.

The sensor 150 is coupled to the storage device 214. The sidewall hybrid connector 212 is coupled to the interface 216 of the storage device 214. The sidewall hybrid connector 212 may have an optical interface and an electrical interface. The face of the sidewall hybrid connector 212 may be hermetically sealed. Additionally, the side of the sidewall hybrid connector 212 may include an O-ring seal. Accordingly, in some embodiments, the sidewall hybrid connector 212 may withstand a pressure up to about 25 kilo-pounds per square inch. The sidewall hybrid connector 212 may also include expanded beam connectors for the optical connections. The components within the sidewall hybrid connector 212 may include an epoxy that may be any suitable composition, such as Stycast®, etc.

The computing device 202 includes a storage medium 203. As further described below, data stored in the storage medium 218 (in the downhole tool 124) is downloaded therefrom into the storage medium 203 (in the computing device 202) through an optical signal carrier (such as a fiber optic cable) within the hybrid cable 208. Alternatively or in addition, data in the storage medium 203 may be uploaded into the storage medium 218 through the optical signal carrier within the hybrid cable 208.

In some embodiments, the data communication rate between the downhole tool 124 and the computing device 202 through the optical interface of the sidewall hybrid connector 212 is at, at least about 50 megabits per second. The use of the optical interface for communication allows the cable length to exceed 1000 feet without significant signal loss or signal interference. However, an electrical signal carrier does not provide such a benefit.

As described above, while in a downhole position, the sensor 150 may generate data based on the monitoring of one or more subsurface characteristics downhole. The sensor 150 may then store such data into the storage medium 218. While the system 200 illustrates one sensor 150 and one storage medium 218, the downhole tool 124 may include one to a number of different sensors 150 and storage mediums 218 as well as other components for storage of data that is generated by the sensors 150.

The storage medium 218 may be any of a number of different types of mediums, including different types of Random Access Memory (RAM), FLASH memory, magnetic disk drives, etc. For example, the storage medium 218 can be a Static RAM (SRAM), a Synchronous Dynamic RAM (SDRAM), DRAM, a double data rate (DDR) Synchronous Dynamic RAM (SDRAM), etc.

The interface 206 is coupled to the computing device 202 and to the hybrid cable 208. As further described in more detail below, the hybrid cable 208 may include an electrical signal carrier (electrical wire(s)) and an optical signal carrier (e.g., fiber optic cable(s)). The electrical signal carrier may be used to supply power (e.g., AC or DC power) to the electronics 214 within the downhole tool 124, while the optical signal carrier may be used to provide communications between the downhole tool 124 and the computing device 202 (through the interface 206). For example, in one embodiment, the hybrid cable 208 may include two electrical wires for supplying power and two fiber optic cables (one fiber optic cable uses for transmission and the other for receipt). In such an embodiment, the two electrical wires may be used to provide "intrinsically safe" power to the downhole tool 124 using barriers within the power source 204.

As further described below, the downhole tool 124 and the interface 206 may include optical transceivers that convert an electrical signal to an optical signal and vice versa. In some embodiments, these transceivers may be bidirectional, which use different wavelengths to transmit and receive using a single optical signal carrier. In one such embodiment, two optical signal carriers may be used to provide two independent communication channels. The optical communications may be a half-duplex type, wherein only one end communicates at a given time using a same or similar wavelength. In one such embodiment, two optical signal carriers may be used to provide two independent communication channels. In some embodiments, an electrical communication may be used during the download and/or upload operation. Such electrical communication may be at a low data rate in order to be defined as "intrinsically safe" and to satisfy the requirements for operation in a Class I, Division 1 Area, Zone 0 or Zone 1.

This electrical communication may include two electrical wires for upload communications, while the optical signal carrier may be used for the download communications. In one such embodiment, if there are two optical signal carriers, both such carriers may be used for the download communications. For example, the hybrid cable 208 may include two electrical signal carriers for communications from the computing device 202 to the downhole tool 124 and vice versa. The hybrid cable 208 may also include two optical signal carriers for communications from the downhole tool 124 to the computing device 202 and vice versa.

The interface 206 may provide conversion from an optical signal to an electrical interface into the computing device 202. For example, the interface 206 may convert to any of a number of different electrical interfaces into the computing device 202, including a Peripheral Component Interconnect (PCI) interface, different types of a Universal Serial Bus (USB) interface (e.g., USB 2.0), an Institute of Electrical and Electronics Engineers Inc. (IEEE) 1394 (Firewire) interface, etc.

The storage medium 203 may be any of a number of different types of mediums, including different types of Random Access Memory (RAM), FLASH memory, magnetic disk drives, etc. For example, the storage medium 203 can be a Static RAM (SRAM), a Synchronous Dynamic RAM (SDRAM), DRAM, a double data rate (DDR) Synchronous Dynamic RAM (SDRAM), etc. The storage medium 203 may be powered by the power source 204 and/or from a power source within the downhole tool 124.

As shown, the power source 204 may be coupled to supply power to the computing device 202. The power source 204 may also be coupled to supply intrinsically safe power to the storage device 214 within the downhole tool 124 through the electrical signal carrier(s) within the hybrid cable 208.

Embodiments of the invention are not limited to the configuration shown in the system 200. For example, the downhole tool 124 may include a power source, such as a battery (not shown). Accordingly, the storage device 218 and/or the storage medium 203 may be powered by an internal power source within the downhole tool 124, instead of the power source 204. Thus, data stored in the storage mediums 202 and 218 may be transmitted from one storage medium to the other by power supplied by the power source 204 and/or by power supplied by a power source within the downhole tool 124. In one embodiment, the power supplied downhole to the downhole tool 124 may shut off while the downhole tool 124 is on the surface (e.g., on the rig floor).

While the downhole tool 124 is on the surface, the ambient environment may include one to a number of different combustible or ignitable gases. For example, the downhole tool 124 may be in a Class I, Division 1 Area, Zone 0 or Zone 1. Therefore, the connection from the hybrid cable 208 to the downhole tool 124 may need to be "intrinsically safe". The computing device 202 may or may not be within an ambient environment that may include combustible or ignitable gases. For example, a length of the hybrid cable 208 may be such that the computing device 202 is outside of the Class I, Division 1 Area, Zone 0 or Zone 1.

The power source 204 may supply power to the downhole tool 124 that is less than or equal to about 12 volts. Accordingly, such power, if intrinsically barrier, is classified as intrinsically safe and satisfies requirements for operation in a Class I, Division 1 Area, Zone 0 or Zone 1. Additionally, the standards for operations within a Class I, Division 1 Area, Zone 0 or Zone 1 are in relation to electrical connections. The communications using the optical medium within the hybrid cable 208 can also satisfy operations within the Class I, Division 1 Area, Zone 0 or Zone 1 if the energy density of the communications using the optical medium is designed to operate in a Class I, Class II, Zone 0 or Zone 1. Because the supplying of power and the optical communications can satisfy the standards for the Class I, Division 1 Area, Zone 0 or Zone 1, a hot work permit is not needed during data communication operations between the downhole tool 124 and the computing device 202 using the hybrid cable 208 and vice versa.

Therefore, embodiments of the invention provide a higher data bandwidth communication relative to electrical-based communications (such as copper wire, coaxial cable, etc.). For example, the optical data communications involving the downhole tool 124 may be above about 50 megabits/second at a distance of 1000 feet. Moreover, embodiments of the invention provide optical communications that satisfy the standards for connections for a Class I, Division 1 Area, Zone 0 or Zone 1, having an "intrinsically safe" connection to the downhole tool 124 on the rig floor (that may include combustible gases in the ambient environment).

Figure 2B:
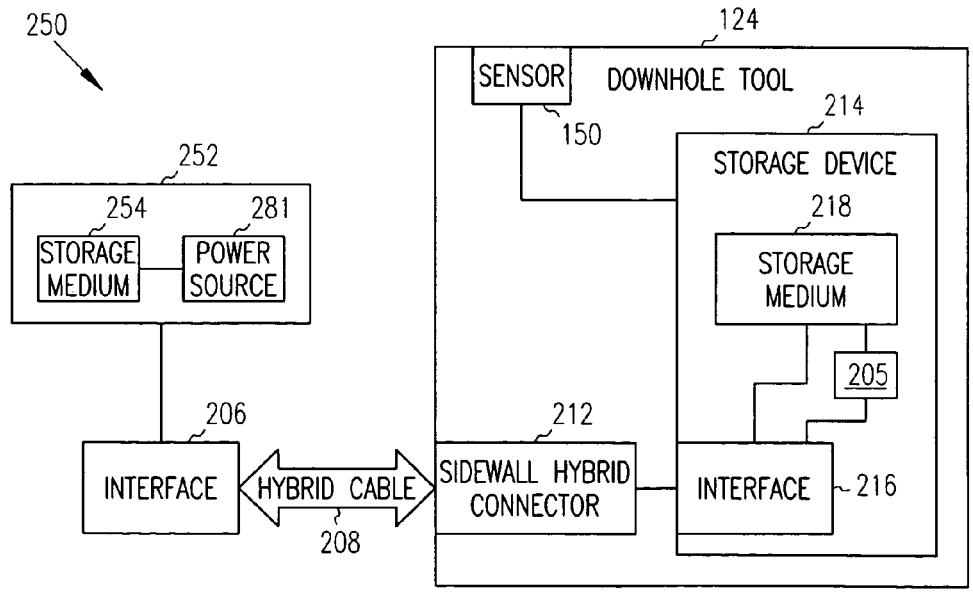
FIG. 2B illustrates a block diagram of a system for data communications with a downhole tool, according to another embodiment of the invention.

FIG. 2B illustrates a block diagram of a system for data communications with a downhole tool, according to another embodiment of the invention. In particular, FIG. 2B illustrates a system 250 that includes a storage device 252, the hybrid cable 208 and the downhole tool 124. The system 250 illustrates the use of the storage device 252, which may be smaller in size and more portable in comparison to the computing device 202 (shown in FIG. 2A). The storage device 252 may be configured as an "intrinsically safe" device, wherein connections thereto include barriers to satisfy the requirements for operation in a Class I, Division 1 Area, Zone 0 or Zone 1. Alternatively or additionally, the storage device 252 may be within an explosion proof box.

The storage device 252 includes a storage medium 254 and a power source 281. The storage medium 254 may be any of a number of different types of mediums, including different types of Random Access Memory (RAM), FLASH memory, magnetic disk drives, etc. For example, the storage medium 254 can be a Static RAM (SRAM), a Synchronous Dynamic RAM (SDRAM), DRAM, a double data rate (DDR) Synchronous Dynamic RAM (SDRAM), etc. As further described below, data stored in the storage medium 218 (in the downhole tool 124) is downloaded there from into the storage medium 254 (in the storage device 252) through an optical signal carrier within the hybrid cable 208 and vice versa. Alternatively or in addition, data in the storage medium 254 may be uploaded into the storage medium 218 through the optical signal carrier within the hybrid cable 208. Data stored in the storage mediums 254 and 218 may be transmitted from one storage medium to the other by power supplied by the power sources 204/281 and/or by power supplied by a power source within the downhole tool 124. Alternatively or in addition, such power may be supplied by a power source (not shown) that is not independent of the computing device 202 and the downhole tool 124. For example, such a power source may be located on the rig floor in an intrinsically safe configuration (e.g., within an explosion-proof box).

Therefore, the communications using the optical signal carrier within the hybrid cable 208 also satisfy operations within the Class I, Division 1 Area, Zone 0 or Zone 1. The energy density of the communications using the optical signal carrier may operate in a Class I, Class II, Zone 0 or Zone 1. Because the supplying of power and the optical communications satisfy the standards for the Class I, Division 1 Area, Zone 0 or Zone 1, a hot work permit is not needed during data communication operations of between the downhole tool 124 and the storage device 252 using the hybrid cable 208.

Figure 3A:
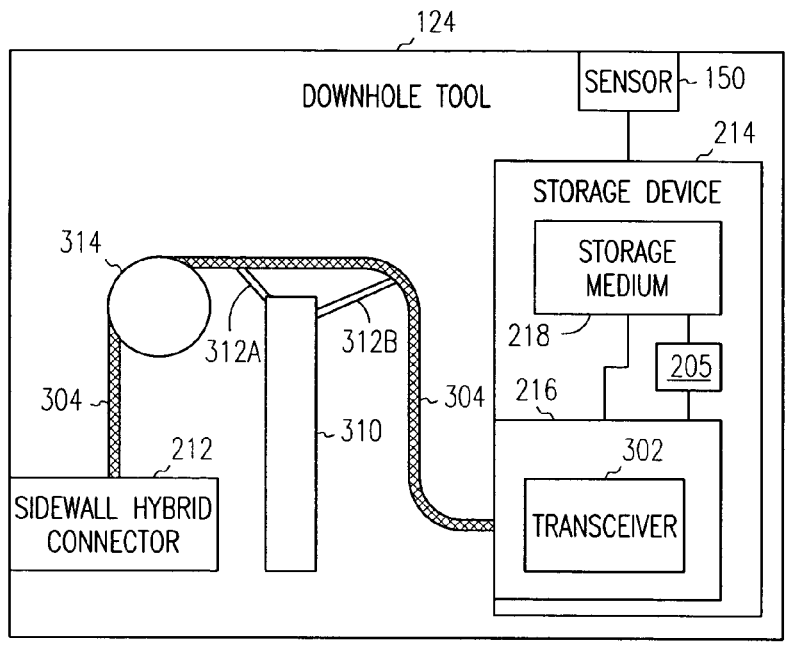
FIG. 3A illustrates a more detailed block diagram of a part of a downhole tool related to conversion of communications between optical and electrical signaling, according to one embodiment of the invention.

FIG. 3A illustrates a more detailed block diagram of a part of a downhole tool related to conversion of communications between optical and electrical signaling, according to one embodiment of the invention. The downhole tool 124 includes the sidewall hybrid connector 212, the storage device 214, a spindle 314, a component 310 and routing fixtures 312A-312B. The storage device 214 may include the interface 216, which is coupled to the storage medium 218. The storage device 214 also includes the control logic 205 coupled to the storage medium 218 and the interface 216. The interface 216 includes a transceiver 302. The transceiver 302 may be an optical/electrical transceiver that converts an electrical signal to an optical signal and vice versa. The downhole tool 124 may be configured such that the sidewall hybrid connector 212 is hermetically sealed. Accordingly, the transceiver 302 is sealed from an ambient environment that is external to the downhole tool 124. Therefore, the data communications using an electrical signal is not exposed to the ambient environment.

The sidewall hybrid connector 212 is coupled to the transceiver 302 of the storage device 214 through an optical signal carrier 304. The optical signal carrier 304 may be different types of optical mediums including different types of fiber optic cables. As shown, the optical signal carrier 304 may be wrapped around the spindle 314. The downhole tool 124 also may include routing fixtures 312A-312B to help route the optical signal carrier 304, while satisfying the requirements for the given optical signal carrier 304 (e.g., the bend radius, etc.). As shown, the routing fixtures 312A-312B are coupled to the component 310 and are affixed to the optical signal carrier 304 to assist in the routing from the sidewall hybrid connector 212 to the storage device 214 around the component 310. The routing fixtures 312A-312B may be composed of different flexible high temperature material that would be formed to a specific radius (for satisfying the bend radius requirement for the optical signal carrier 304). Examples of such material from which the routing fixtures 312A-312B may be composed include Teflon®, PEEK, Viton®, etc.

The optical signal carrier 304 may be a multi-mode fiber, wherein a diameter of the fiber may be about 50 microns. A multi-mode fiber can allow such fiber to be easier aligned with that which its connects because the diameter of such fiber is larger in comparison to a single mode fiber. Accordingly, because the downhole environment is typically a high vibrational environment, a multi-mode fiber can maintain alignment more easily in comparison to a single mode fiber. However, embodiments of the invention are not so limited, as the optical signal carrier 304 may be a single mode fiber, etc. In an embodiment, the optical signal carrier 304 may withstand a temperature range of about −60° C. to about 200° C. Moreover, the optical signal carrier 304 may be coated with a soft coating material to allow for easier routing within the downhole tool 124 and to provide better survivability under vibration. For example, the optical signal carrier 304 may be coated with carbon silicone, a Teflon® TFA buffer, etc.

Figure 4A:
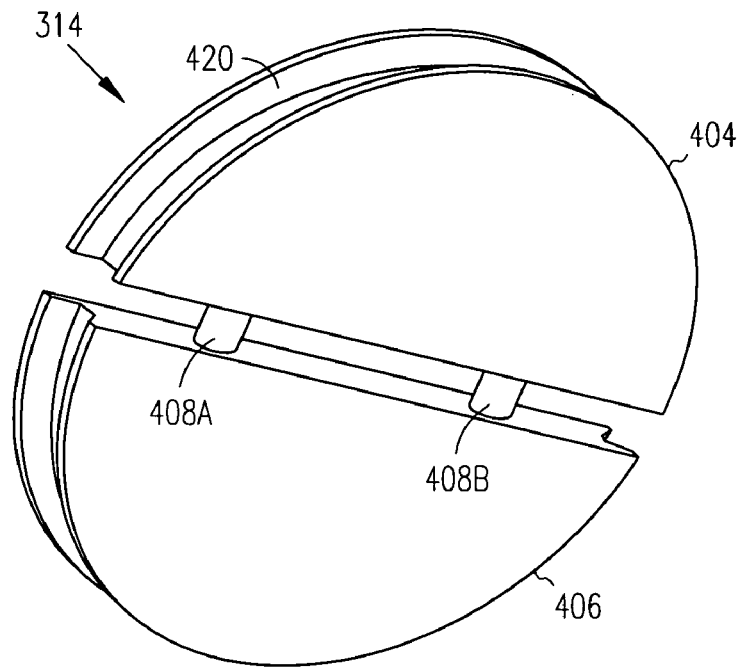
FIGS. 4A-4B illustrate a spindle to store one or more service loops of an optical carrier within a downhole tool, according to one embodiment of the invention.
Figure 4B:
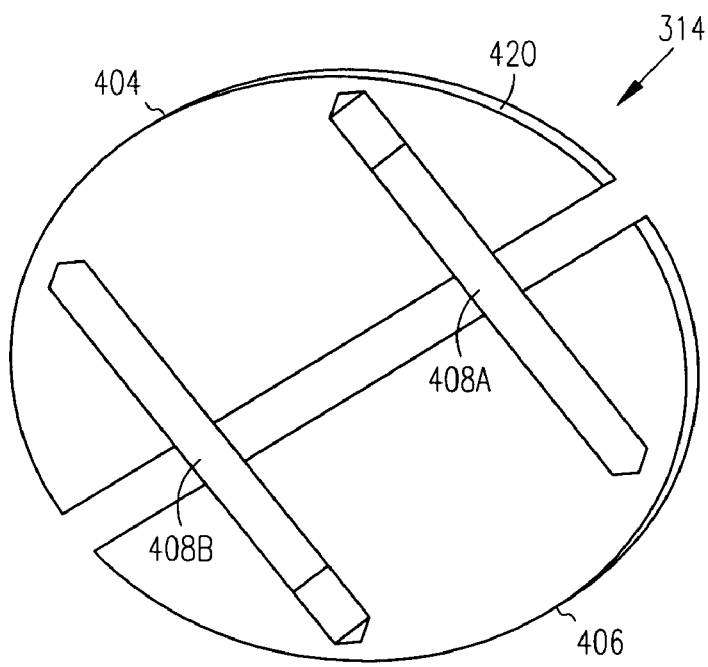

In one embodiment, the optical signal carrier 304 may have a bend radius of less than or equal to about six millimeters. The storage device 214, the sidewall hybrid connector 212 and the optical signal carrier 304 may be within a number of different types of downhole tools 124. Accordingly, the configuration for coupling the sidewall hybrid connector 212 to the storage device 214 through the optical signal carrier 304 may vary depending on the type of downhole tool 124. Additionally, the distance from the sidewall hybrid connector 212 to the storage device 214 may also vary depending on the type of downhole tool 124. Therefore, in one embodiment, the length of the optical signal carrier 304 may be longer than needed to couple the sidewall hybrid connector 212 to the storage device 214 for a given downhole tool 124 and different configurations within a given downhole tool 124. For example, additional components may be introduced into the downhole tool 124 that cause a change in the configuration of the components therein. As shown, the additional length of the optical signal carrier 304 may be wrapped around the spindle 314 to provide a service loop. Additionally, the spindle 314 is such that the bend radius for the optical signal carrier 304 is satisfied. One embodiment of such a spindle is illustrated in FIGS. 4A-4B, which are described in more detail below.

The component 310 is shown in the FIG. 3A to illustrate the different bends in the optical signal carrier 304 that may be needed in order to couple the sidewall hybrid connector 212 to the interface 216. The component 310 may be any of a number of different types of components (electrical, mechanical, electromechanical) used within the downhole tool 124.

In operation, for the downloading of data from the storage medium 218, the transceiver 302 may receive the data as an electrical signal (from the storage medium 218) and convert this signal into an optical signal. The transceiver 302 may then transmit this optical signal to the sidewall hybrid connector 212 for optical data transmission external to the downhole tool 124. Such an embodiment provides an optical connection to the downhole tool 124 for data transmission. The electrical signaling for data transmission remains within the downhole tool 124. Additionally, the transceiver 302 may receive data from a surface storage device (such as the storage device 202) as an optical signal and convert to an electrical signal prior to storing in the downhole tool 124. Accordingly, the data transmission may operate at a high data rate and yet be "intrinsically safe" and operational in a Class I, Division 1 Area, Zone 0 or Zone 1.

Figure 3B:
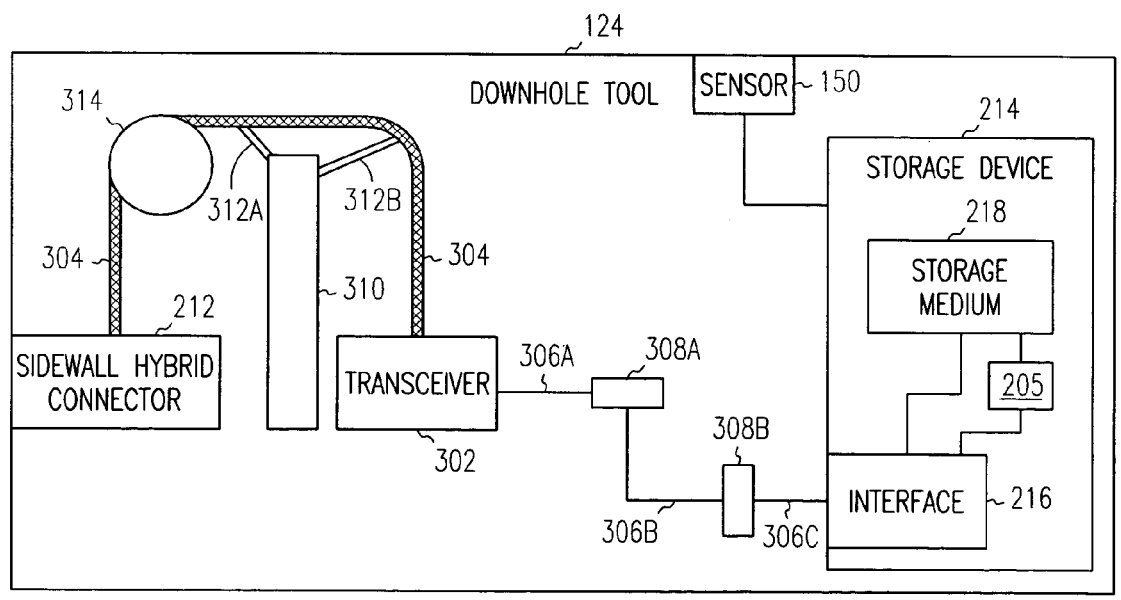
FIG. 3B illustrates a more detailed block diagram of a part of a downhole tool related to conversion of communications between optical and electrical signaling, according to another embodiment of the invention.

FIG. 3B illustrates a more detailed block diagram of a part of a downhole tool related to conversion of communications between optical and electrical signaling, according to another embodiment of the invention. In particular, FIG. 3B illustrates an alternative configuration of the downhole tool 124, according to one embodiment of the invention.

The downhole tool 124 includes the sidewall hybrid connector 212, the storage device 214, the transceiver 302, the component 310 and the routing fixtures 312A-312B. The storage device 214 includes the interface 216, which is coupled to the storage medium 218. The storage device 214 also includes the control logic 205 coupled to the storage medium 218 and the interface 216. As shown, the transceiver 302 is within the downhole tool 124 but external to the storage device 214. The sidewall hybrid connector 212 is coupled to the transceiver 302 through the optical signal carrier 304. The transceiver 302 is coupled to the interface 216 through a number of electrical signal carriers 306A-306C and a number of connectors 308A-308B. In particular, the transceiver 302 is coupled to the connector 308A through the electrical signal carrier 306A. The connector 308A is coupled to the connector 308B through the electrical signal carrier 306B. The connector 308B is coupled to the interface 216 through the electrical signal carrier 306C. Such connectors 308A-308B may be needed because of the type of configuration within the downhole tool 124.

As shown, electrical signal carriers (and not optical signal carriers) are used to connect through the series of connectors 308A-308B. Typically, optical connectors require very high mating precision and such connectors may be less desirable to be used if the mechanical connection is less precise and subject to high vibration. Moreover, such optical connectors are typically more expensive in comparison to connectors for connecting electrical signal carriers. Therefore, if the coupling of the sidewall hybrid connector 212 to the storage device 214 includes a number of different connectors, the transceiver 302 may be located in front of one or more of such connectors (as shown in FIG. 3B) to reduce costs and signal loss and to simultaneously permit communications in an intrinsically safe manner as described above.

Figure 3C:
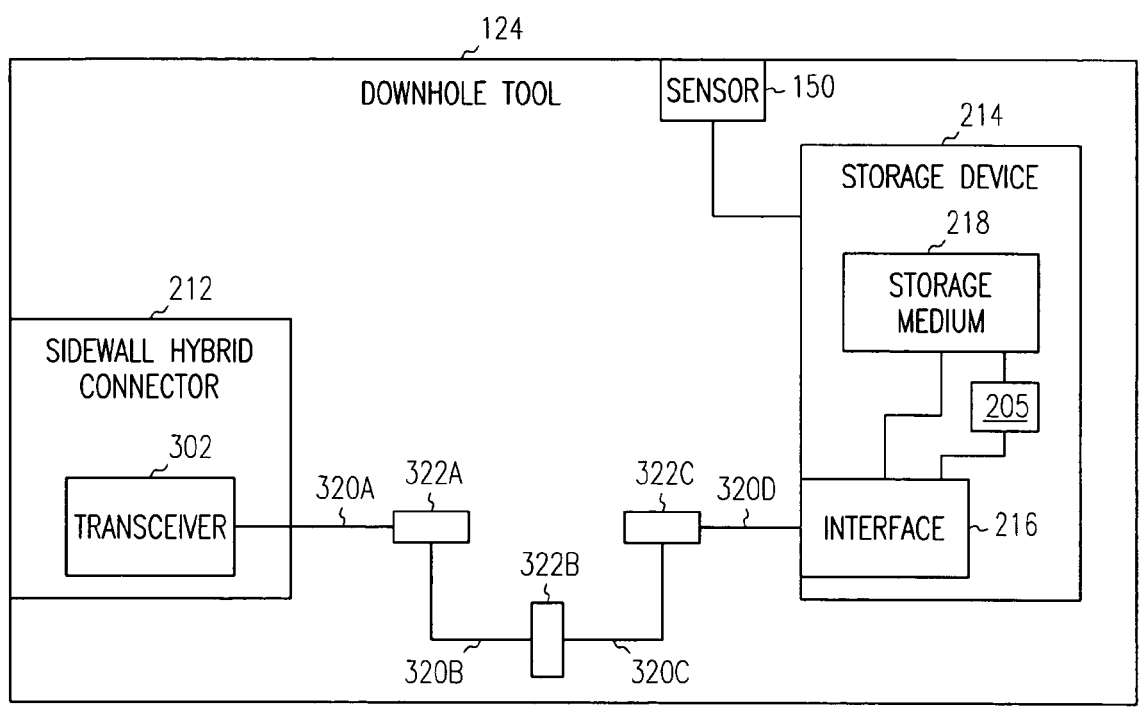
FIG. 3C illustrates a more detailed block diagram of a part of a downhole tool related to conversion of communications between optical and electrical signaling, according to another embodiment of the invention.

FIG. 3C illustrates a more detailed block diagram of a part of a downhole tool related to conversion of communications between optical and electrical signaling, according to another embodiment of the invention. In particular, FIG. 3C illustrates an alternative configuration of the downhole tool 124, according to one embodiment of the invention.

The downhole tool 124 includes the sidewall hybrid connector 212 and the storage device 214. The sidewall hybrid connector 212 includes the transceiver 302. Accordingly, the optical to electrical conversion is still performed internal to the downhole tool 124, but within the sidewall hybrid connector 212. Because the transceiver 302 is within the sidewall hybrid connector 212, the sidewall hybrid connector 212 is coupled to the storage device 214 through electrical signal carriers. In particular, the transceiver 302 is coupled to a connector 322A through an electrical signal carrier 320A. The connector 322A is coupled to a connector 322B through an electrical signal carrier 320B. The connector 322B is coupled to a connector 322C through an electrical signal carrier 320C. The connector 322C is coupled to the interface 216 through an electrical signal carrier 320D. Accordingly, the optical signal carrier in the downhole tool 124 for connection to the storage device 214 is within the sidewall hybrid connector 212 (not shown).

Embodiments for connecting the sidewall hybrid connector 212 to the storage device 214 are not limited to those illustrated in FIGS. 3A-3C. For example, while the embodiments of the downhole tool 124 within the FIGS. 3A-3C illustrate a number of connectors for connecting to the storage device 214, such embodiments may include connection into the storage device 214 without such connectors. Additionally, while the embodiments of the downhole tool 124 within the FIGS. 3A-3B illustrate the use of the spindle 314 for wrapping additional optical signal carrier 304 for use as a service loop, in alternative embodiments, the additional optical signal carrier 304 is not used (and therefore the spindle 314 is not incorporated therein). Moreover, while the embodiments of the downhole tool 124 within the FIGS. 3A-3C illustrate that connectors are not used in relation to the optical signal carrier 304, in an embodiment, one or more optical connectors may be used to connecting a number of optical signal carriers 304 together.

FIGS. 4A-4B illustrate a spindle to store one or more service loops of an optical carrier within a downhole tool, according to one embodiment of the invention. In particular, FIGS. 4A-4B illustrate one embodiment of the spindle 314 (shown in FIGS. 3A-3B) for storage of the excess optical signal carrier 304. FIG. 4A and FIG. 4B illustrate a front view and a back view of the spindle 314, respectively. The spindle 314 includes an upper part 404 and a lower part 406. The upper part 404 and the lower part 406 are coupled together with slip pins 408A-408B. The slip pins 408A-408B allow for adjustment of the circumference of the spindle 314 to accommodate for any extra length of the optical signal carrier 304. The circumference of the upper part 404 and the lower part 406 include one or more grooves 420 to allow the optical signal carrier 304 to be wrapped therein. In an embodiment, the upper part 404 and the lower part 406 are configured to have a radius greater than approximately the minimum bend radius of the optical signal carrier 304.

Some embodiments of the storage device 214 are now described. In particular, FIGS. 5A-5C illustrate more detailed block diagrams of a storage device within a downhole tool, according to embodiments of the invention. FIG. 5A illustrates a more detailed block diagram of a storage device within a downhole tool having an electrical signal carrier for communications therein, according to one embodiment of the invention.

As shown, the storage device 214 includes an accumulation storage medium 502, a number of storage mediums 506A-506N, the control logic 205 and the interface 216. The storage mediums 506A-506N are coupled to the accumulation storage medium 502 through an electrical signal carrier 508 (e.g., by a memory bus). Although not shown, the control logic 205 is coupled to the accumulation storage medium 502, to the number of storage mediums 506A-506N and to the interface 216.

The accumulation storage medium 502 is coupled to output the data through the interface 216 from the storage device 214 through an electrical signal carrier 510. The electrical signal carrier 508 and the electrical signal carrier 510 may be electrical wire(s) or other electrical conduit. Although not shown, the control logic 205 is coupled to the accumulation storage medium 502 and the storage mediums 506A-506N for controlling the transfer of data among such mediums, and between the accumulation storage medium 502 and the interface 216.

The number of storage mediums 506A-506N may store data for one or more sensors/subtools. For example, the storage medium 506A may store data for a first sensor; the storage medium 506B may store data for a second sensor; and the storage medium 506N may store data for a third sensor via electrical connections, not shown, or via the accumulation storage medium 502. Additionally, in some embodiments, the accumulation storage medium 502 may be associated with one or more sensors for storage of data. In other embodiments, the accumulation storage medium 502 is not specifically associated with sensors for storage of data. In operation, the accumulation storage medium 502 may receive the data from the storage mediums 506A-506N through the electrical signal carrier 508. This accumulated data stored in the accumulation storage medium 502 may be output and input through the interface 216 of the storage device 214 through the electrical signal carrier 510.

FIG. 5B illustrates a more detailed block diagram of a storage device within a downhole tool having an optical signal carrier for communications therein, according to one embodiment of the invention. As shown, the storage device 214 includes the accumulation storage medium 502, the number of storage mediums 506A-506N, the control logic 205 and the interface 216. The storage mediums 506A-506N are coupled to the accumulation storage medium 502 through an optical signal carrier 512. The accumulation storage medium 502 is coupled to output the data through the interface 216 from the storage device 214 through the electrical signal carrier 510. The optical signal carrier 512 may be fiber optic cable(s) or other optical conduit.

In operation, the accumulation storage medium 502 may receive the data from the storage mediums 506A-506N through the optical signal carrier 512. This accumulated data stored in the accumulation storage medium 502 may be output and input through the interface 216 of the storage device 214 through the electrical signal carrier 510. If an optical signal carrier is used to communicate among the storage mediums 506A-506N, the accumulation storage medium 502 and the externally disposed storage medium 203, the interface 216 may be removed.

In some embodiments, the data stored in the number of storage mediums 506A-506N may be transferred to the accumulation storage medium 502 while the downhole tool 124 is still downhole. In one embodiment, the data stored in the storage mediums 506A-506N may be transferred to the accumulation storage medium 502 if the temperature is less than a predetermined temperature. Some optical signal carrier may only be operational below given temperatures or within a range of temperatures. For example, this predetermined temperature may be about 80° C., 85° C. or 90° C. The data stored in the number of storage mediums 506A-506N may also only be transferred to the accumulation storage medium 502 if the temperature is within a range. For example, the range may be about −60° C. to 85° C., about −55° C. to 90° C. In other embodiments, the transfer of the data is independent of the temperature. For example, the data stored in the storage mediums 506A-506N may not transferred to the accumulation storage medium 502 until the downhole tool 124 is at ambient temperature at the surface.

FIG. 5C illustrates a more detailed block diagram of a storage device within a downhole tool having an electrical signal carrier and an optical signal carrier, according to one embodiment of the invention. As shown, the storage device 214 includes the accumulation storage medium 502, the number of storage mediums 506A-506N, the control logic 205 and the interface 216. The storage mediums 506A-506N are coupled to the accumulation storage medium 502 through the electrical signal carrier 508 and the optical signal carrier 512. The accumulation storage medium 502 is coupled to output the data through the interface 216 from the storage device 214 through the electrical signal carrier 510.

In operation, the accumulation storage medium 502 may receive the data from the storage mediums 506A-506N through the electrical signal carrier 508 or the optical signal carrier 512. This accumulated data stored in the accumulation storage medium 502 may be outputted through the interface 216 of the storage device 214 through the electrical signal carrier 510. One embodiment of the operations of the storage device 214 shown in FIG. 5C is described in more detail below in conjunction with the flow diagram 700 of FIG. 7.

While FIGS. 5A-5C illustrate the storage device 214 such that the data is only output from the storage device 214 from the accumulation storage medium 502, embodiments of the invention are not so limited. In alternative embodiments, the storage mediums 506A-506N are coupled to the interface 216 and output data stored therein under the control of the control logic 205 (independent of the accumulation storage medium 502).

Figure 6:
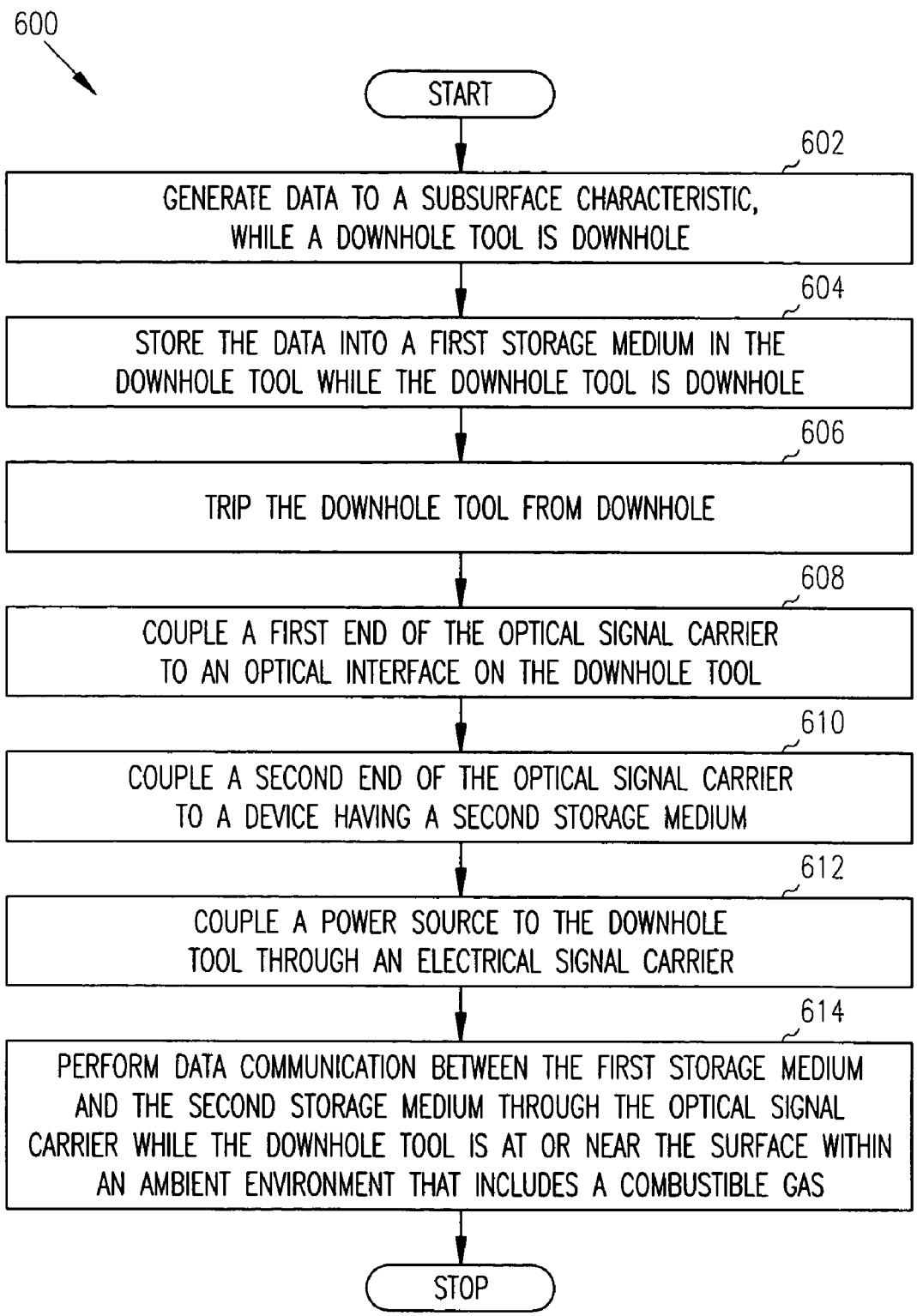
FIG. 6 illustrates a flow diagram for data communications with a downhole tool, according to one embodiment of the invention.

A more detailed block diagram of one embodiment of the data communications involving a downhole tool is now described. FIG. 6 illustrates a flow diagram for data communications with a downhole tool, according to one embodiment of the invention.

In block 602, data related to a subsurface characteristic is generated, while a downhole tool is downhole. With reference to the embodiment of FIGS. 1 and 2A-2B, the sensor 150 on the downhole tool 124 generates this data related to a subsurface characteristic. Such data includes different parameters and conditions downhole, including the temperature and pressure downhole, the various characteristics of the earth formations (such as resistivity, porosity, density, etc.), the characteristics of the borehole (e.g., size, shape, etc.), etc. Control continues at block 604.

In block 604, the data (related to the subsurface characteristic) is stored in a first storage medium in the downhole tool while the downhole tool is downhole. With reference to the embodiment of FIGS. 2A-2B, the data is transmitted from the sensor 150 to the storage device 214, wherein the data is stored in the storage medium 218. While described with reference to data for a given subsurface characteristic for storage into a given storage medium, the operations of the flow diagram 600 may include data generated and stored for a number of different subsurface characteristics by a number of different sensors. Such data may be stored in one or more storage mediums. Control continues at block 606.

In block 606, the downhole tool is tripped from downhole. With reference to the embodiment of FIG. 1, the drill string 108 (that includes the downhole tool 124) is tripped from downhole to the surface (e.g., on the drilling rig floor). Control continues at block 608.

In block 608, a first end of an optical signal carrier is coupled to an optical interface on the downhole tool. With reference to the embodiments of FIG. 2A-2B, an optical signal carrier (within the hybrid cable 208) is coupled to an optical interface (within the sidewall hybrid connector 212) on the downhole tool 124. Control continues at block 610.

In block 610, a second end of the optical signal carrier is coupled to an optical interface for a device having a second storage medium. With reference to the embodiments of FIGS. 2A-2B, the optical signal carrier (within the hybrid cable 208) is coupled to an optical interface (within the interface 206) for the computing device 202. Control continues at block 612.

In block 612, a power source is coupled to the downhole tool through an electrical signal carrier. With reference to the embodiments of FIGS. 2A-2B, the power source 204 is coupled to the sidewall hybrid connector 212 of the downhole tool 124 through an electrical signal carrier (within the hybrid cable 208). Control continues at block 614.

In block 614, data communications is performed between the first storage medium (in the downhole tool) to the second storage medium (in the computing/storage device) through the optical signal carrier, while the downhole tool is at the surface and may be within an ambient environment that includes a combustible gas. With reference to the embodiments of FIG. 2A-2B, the data stored in the storage medium 218 may be downloaded from the downhole tool 124 through the optical signal carrier within the sidewall hybrid connector 212 and into the storage medium 203/254. Alternatively or in addition to, the data stored in the storage medium 203/254 may be uploaded to the storage medium 218 in the downhole tool 124 through the optical signal carrier within the sidewall hybrid connector 212.

Figure 7:
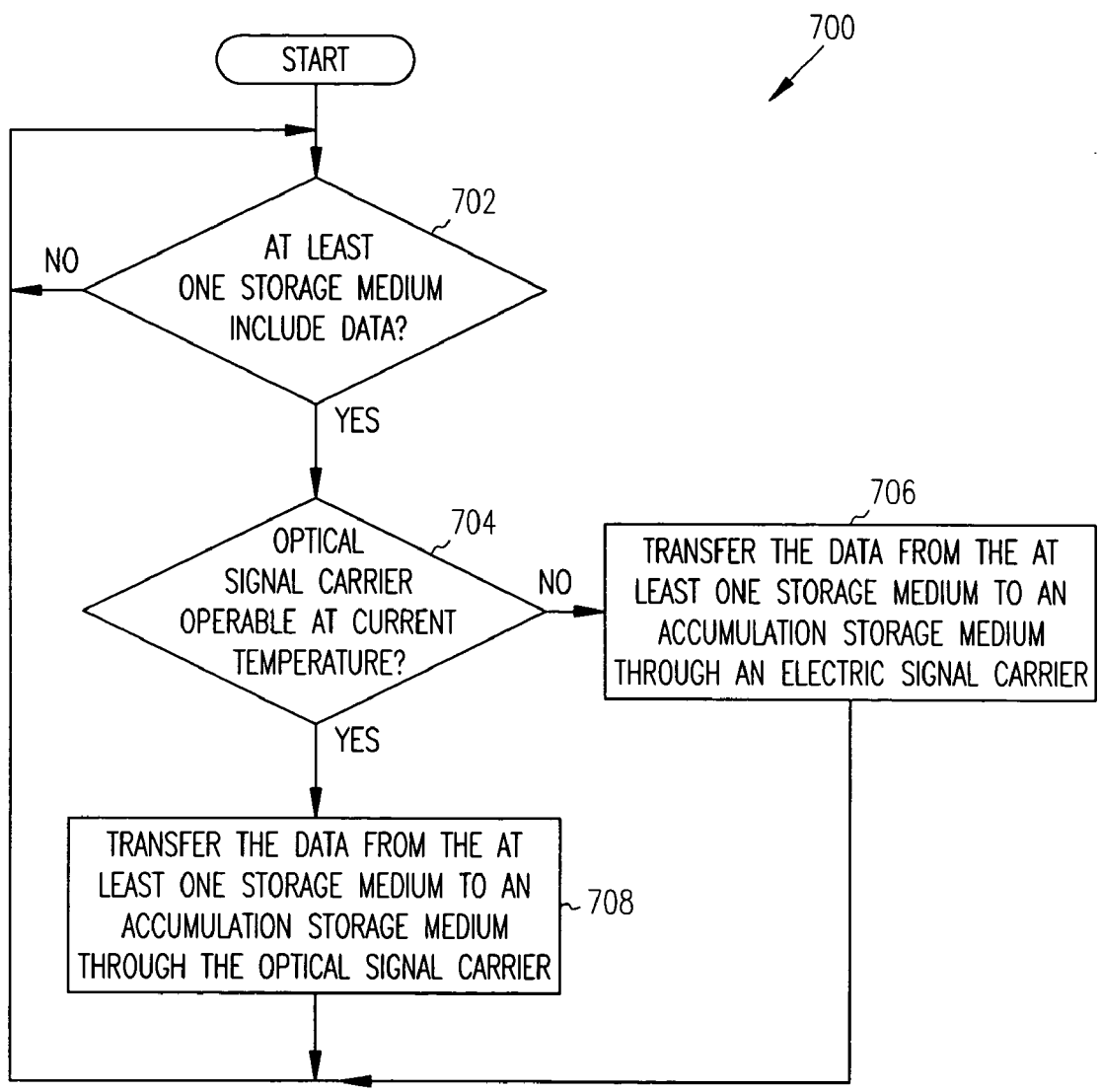
FIG. 7 illustrates a flow diagram for transferring of data from a number of storage mediums for different sensors to an accumulation storage medium in a downhole tool, according to one embodiment of the invention.

FIG. 7 illustrates a flow diagram for transferring of data from a number of storage mediums for different sensors to an accumulation storage medium in a downhole tool, according to one embodiment of the invention. In particular, the flow diagram 700 illustrates one embodiment of the operations of the storage device 214 shown in FIG. 5C.

In block 702, a determination is made of whether at least one storage medium includes data. With reference to the embodiment of FIG. 5C, the control logic 205 determines whether at least one of the storage mediums 506A-506N includes data. Upon determining that none of the storage mediums include data, control continues at block 702, where this determination is again made.

In block 704, upon determining that at least one of the storage mediums includes data, a determination is made of whether the optical signal carrier (from the storage mediums 506A-506N to the accumulation storage medium 502) is operable at the current temperature. With reference to the embodiment of FIG. 5C, the control logic 205 makes this determination. For example, the control logic 205 may be coupled to a temperature sensor or have access to the current temperature by some other means. In one embodiment, the data stored in the storage mediums 506A-506N may be transferred to the accumulation storage medium 502 using the optical signal carrier 512 if the temperature is less than a predetermined temperature. Some optical signal carriers (such as fiber optic cable and/or some electrical components) may only be operational below given temperatures or within a range of temperatures. For example, this predetermined temperature may be about 80° C., about 85° C. or about 90° C., while the range of temperatures may be about −60° C. to about 85° C., about −55° C. to about 90° C.

In block 706, upon determining that the optical signal carrier and/or the temperature sensitive component (from the storage mediums 506A-506N to the accumulation storage medium 502) is not operable at the current temperature, the data is transferred from the at least one storage medium to an accumulation storage medium through the electrical signal carrier. With reference to the embodiment of FIG. 5C, the control logic 205 causes the data to be transferred, through the electrical signal carrier 508, from at least one storage mediums 506A-506N having data to the accumulation storage medium 502. Control continues at block 702, wherein a determination is made of whether at least one of the storage mediums 506A-506N includes data.

In block 708, upon determining that the optical signal carrier (from the storage mediums 506A-506N to the accumulation storage medium 502) is operable at the current temperature, the data is transferred from the at least one storage medium to an accumulation storage medium through the optical signal carrier. With reference to the embodiment of FIG. 5C, the control logic 205 causes the data to be transferred, through the optical signal carrier 512, from at least one storage mediums 506A-506N having data to the accumulation storage medium 502. Control continues at block 702, wherein a determination is again made of whether at least one of the storage mediums 506A-506N includes data.

In some embodiments, the data transfer rate through the optical signal carrier 512 is greater than the data transfer rate through the electrical signal carrier 508. Accordingly, such an embodiment allows the data to be transferred at a higher data transfer rate while the optical signal carrier 512 is operational (e.g., below a predetermined temperature). Moreover, the data continues to be transferred at a lower rate if the temperature is above a certain level or outside the range. One application of such an embodiment may include the transfer of data through the electrical signal carrier 508 while the downhole tool 124 is downhole. Additionally, as the downhole tool 124 is raised to the surface, the temperature may drop, thereby allowing for the transfer of the data to the accumulation storage medium 502 at a faster data transfer rate. Such an embodiment may allow for a faster data communication between the downhole tool 124 and the computing device 202/the storage device 252 (as shown in FIGS. 2A-2B). In particular, the data may be transferred at a higher rate to the accumulation storage medium 502 as the downhole tool 124 is being raised uphole. Accordingly, at least part of the data is accumulated in the accumulation storage medium 502 for transmitting there from.

Accordingly, as described, embodiments of the invention provide for a high throughput for the transfer of data between a bottom hole assembly and a different storage medium or computing device. Moreover, because an optical signal carrier is used for the downloading and uploading of such data, such operations are considered "intrinsically safe" and thus may operate in a Class I, Division 1 Area, Zone 0 or Zone 1 on the drilling floor. In particular, for the transmission of data, embodiments of the invention do not use electrical connections that are exposed to the potentially hazardous gaseous environment.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for optical data communications involving a bottom hole assembly, in accordance with embodiments of the invention. A number of figures show flow diagrams illustrating operations for optical data communications involving a bottom hole assembly, in accordance with embodiments of the invention. The operations of the flow diagrams will be described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagram.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A downhole tool comprising:
    at least one storage medium associated with a first sensor to store data related to a subsurface characteristic; and
    an accumulation storage medium coupled to the at least one storage medium through an optical signal carrier and through an electrical signal carrier, wherein the data is to be transferred from the at least one storage medium to the accumulation storage medium through either the optical signal carrier or the electrical signal carrier based on the relation of the ambient temperature to a predetermined temperature.

2. The downhole tool of claim 1, wherein the accumulation storage medium is associated with a second sensor.

3. The downhole tool of claim 1, wherein the first sensor is to generate the data related to the subsurface characteristic for storage into the at least one storage medium.

4. The downhole tool of claim 1, further comprising a transceiver coupled to the accumulation storage medium, wherein the data is output from the accumulation storage medium through an electrical signal, the transceiver to convert the electrical signal to an optical signal, wherein the transceiver is isolated from an ambient environment that is external to the downhole tool.

5. The downhole tool of claim 4, further comprising an optical interface coupled to the transceiver internal to the downhole tool, wherein the data is to be output from the optical interface as an optical signal external to the downhole tool.

6. A method comprising:
    transferring data from at least one storage medium associated with a first sensor to an accumulation storage medium through either of an optical signal carrier and an electrical signal carrier, wherein the data is transferred through the optical signal carrier if the at least one storage medium includes data and if an ambient temperature is less than a predetermined value; and wherein the data is transferred
    through the electrical signal carrier if the at least one storage medium includes data and if the ambient temperature is above the predetermined value and the data is not transferred through the optical signal carrier.

7. The method of claim 6, wherein the predetermined value is 85° C.

8. The method of claim 6, wherein transferring data from the at least one storage medium associated with the sensor to the accumulation storage medium comprises transferring data from the at least one storage medium associated with the sensor to the accumulation storage medium that is associated with a second sensor.

9. The method of claim 6, further comprising:
    receiving data from the first sensor; and
    storing the data from the first sensor into the at least one storage medium.

10. The method of claim 6, wherein the data is related to a subsurface characteristic that is from a group consisting of a resistivity of a subsurface formation, porosity of the subsurface formation, density of the subsurface formation, a diameter of a borehole and the shape of the borehole.

11. A machine-readable medium that provides instructions, which when executed by a machine, cause said machine to perform operations comprising:

transferring data from at least one storage medium to an accumulation storage medium through either of a first type of carrier and a second type of carrier, wherein the data is transferred through the first type of carrier if the at least one storage medium includes data and if an ambient temperature is less than a predetermined value, and wherein the data is transferred through the second type of carrier if the at least one storage medium includes data and if the ambient temperature is above the predetermined value and the data is not transferred through the first type of carrier.

12. The machine-readable medium of claim 11, wherein a data rate of the first type of carrier is greater than a data rate of the second type of carrier.

13. The machine-readable medium of claim 11, further comprising:
receiving the data from a downhole sensor; and
storing the data from the downhole sensor into the at least one storage medium.

14. The machine-readable medium of claim 11, wherein the predetermined value is about 85° C.

15. The machine-readable medium of claim 11, wherein transferring data from the at least one storage medium to the accumulation storage medium comprises transferring data related to a subsurface characteristic from the at least one storage medium to the accumulation storage medium.

16. The machine-readable medium of claim 15, wherein the subsurface characteristic that is from a group consisting of a resistivity of a subsurface formation, porosity of the subsurface formation, density of the subsurface formation, a diameter of a borehole and the shape of the borehole.

17. A downhole tool comprising:
a storage device having a storage medium for storage of data related to a parameter of a subsurface characteristic;
an optical transceiver coupled to the storage device, wherein the optical transceiver is sealed from an ambient environment that is external to the downhole tool, the optical transceiver to convert an electrical signal to an optical signal related to the data; and
a sidewall hybrid connector having an optical interface and an electrical interface, the optical interface coupled to the optical transceiver through an optical signal carrier to output the data as the optical signal external to the downhole tool, the electrical interface configured to supply power to the downhole tool from an external power source.

18. The downhole tool of claim 17, wherein the ambient environment external to the downhole tool includes an ignitable gas.

19. The downhole tool of claim 17, wherein the subsurface characteristic is from a group consisting of a resistivity of a subsurface formation, porosity of the subsurface formation, density of the subsurface formation, a diameter of a borehole and the shape of the borehole.

20. The downhole tool of claim 17, further comprising a sensor to generate the data related to the parameter of the subsurface characteristic for storage into the storage medium.

21. The downhole tool of claim 17, wherein the sidewall connector further comprises an electrical interface configured to connect to an external source to supply power to the storage device.

22. The downhole tool of claim 17, wherein the electrical interface is to supply power that is less than about 12 volts.

23. The downhole tool of claim 17, wherein the sidewall connector and downhole tool are configured to output the data external to the downhole tool without an electrical connection.

24. The downhole tool of claim 17, wherein the optical interface is configured to safely output the data as the optical signal external to the downhole tool in a designated hazardous location at a drilling location.

25. The downhole tool of claim 24, wherein the optical interface is configured to output the data as the optical signal external to the downhole tool at a rate of at least about 50 megabits per second.

26. A system comprising:
a downhole tool comprising:
a first storage medium to store data related to a subsurface characteristic;
a transceiver that is hermetically sealed within the downhole tool and is coupled to the first storage medium, the transceiver to convert between an electrical signal and an optical signal; and
a sidewall interface comprising an optical interface coupled to the transceiver for optical data communication external to the downhole tool, wherein the optical interface is coupled to a first end of an optical signal carrier, and further comprising an electrical interface; and
a second storage medium coupled to a second end of the optical signal carrier, wherein the data is to be transferred from the first storage medium to the second storage medium or from the second storage medium to the first storage medium while the downhole tool is at or near the surface of a borehole and in an ambient ignitable gas.

27. The system of claim 26, wherein data communication external to the downhole tool for the data to be transferred from the first storage medium to the second storage medium or from the second storage medium to the first storage medium is independent of data communication through an electrical signal carrier.

28. The system of claim 26, wherein the downhole tool further comprises a sidewall electrical interface configured to receive power supplied to the downhole tool to enable data transfer through the optical interface, and wherein the supplied power is less than about 12 volts.

29. The system of claim 26, wherein the data is to be transferred from the optical interface to the second storage medium at a rate of at least 50 megabits per second.

30. The, system of claim 26, wherein the transceiver is coupled to the first storage medium through a different optical signal carrier that is storable in a temperature range from about −−60° C. to about 200° C.

31. A method comprising the acts of:
coupling a first end of an optical signal carrier to an optical interface of a hermetically sealed connector on a downhole tool having a first storage medium, the, optical interface in the form of a sidewall connector on the downhole tool;
coupling a first end of an electrical conductor to an electrical interface of a hermetically sealed connector on the downhole tool, the electrical interface in the form of a sidewall connector on the downhole tool;
coupling a second end of the optical signal carrier to a second device that includes a second storage medium;
supplying power to the downhole tool at about 12 volts or less through the electrical sidewall connector on the downhole tool; and
transferring data between the first storage medium and the second storage medium through the optical signal carrier while the first device is proximate the earth's surface and within an ambient environment that includes a combustible gas.

32. The method of claim 31, wherein transferring data between the first storage medium and the second storage medium through the optical signal carrier comprises transferring data between the first storage medium and the second storage medium through the optical signal carrier, while the downhole tool is in a drilling location having a risk of combustion.

33. The method of claim 31, wherein the optical interface and the electrical interface are located in the same sidewall connector.

34. The method of claim 31, further comprising:
generating the data related to the subsurface characteristic while the downhole tool is downhole during a drilling operation;
storing the data into the first storage medium while the downhole tool is downhole during a drilling operation; and
tripping the downhole tool from downhole before the transferring of data.

35. The method of claim 31, wherein transferring data between the first storage medium and the second storage medium through the optical signal carrier comprises transferring data between the first storage medium and the second storage medium through the optical signal carrier at a rate of at least 50 megabits per second.

36. The method of claim 31, wherein transferring data between the first storage medium and the second storage medium through the optical signal carrier comprises transferring data between the first storage medium and the second storage medium through the optical signal carrier without electrical signaling of the data.

37. A method comprising:
storing data into a first storage medium in a downhole tool for at least one subsurface characteristic while the downhole tool is downhole during a drilling operation;
extracting the downhole tool from downhole;
only after extracting the downhole tool, coupling a first end of an optical signal carrier to an optical interface of a hermetically sealed connector on the downhole tool, and coupling a power source to an electrical connector on the downhole tool; and
transferring the data between the first storage medium and the second storage medium through the optical signal carrier, through use of power supplied to the downhole tool through the electrical connector.

38. The method of claim 37, wherein transferring the data between the first storage medium and the second storage medium through the optical signal carrier is performed independently from any of electrical communication of data.

39. The method of clam 37, wherein the power source supplies power that is less than about 12 volts.

40. The method of claim 37, wherein transferring the data between the first storage medium and the second storage medium through the optical signal carrier comprises transferring the data between the first storage medium and the second storage medium through the optical signal carrier in a designated hazardous location at a drilling location.

41. The method of claim 37, wherein transferring the data between the first storage medium and the second storage medium through the optical signal carrier comprises transferring the data between the first storage medium and the second storage medium through the optical signal carrier at a rate of at least 50 megabits per second.

* * * * *

UNITED STATES PATENT AND TRADEMARK OFFICE
CERTIFICATE OF CORRECTION

PATENT NO. : 7,777,643 B2
APPLICATION NO. : 10/839873
DATED : August 17, 2010
INVENTOR(S) : Cili Sun et al.

It is certified that error appears in the above-identified patent and that said Letters Patent is hereby corrected as shown below:

In column 18, line 47, in Claim 30, delete "--60°" and insert -- -60° --, therefor.

In column 18, line 51, in Claim 31, delete "the," and insert -- the --, therefor.

Signed and Sealed this

Twenty-first Day of December, 2010

David J. Kappos
*Director of the United States Patent and Trademark Office*